(12) United States Patent
Amtmann et al.

(10) Patent No.: US 9,335,226 B2
(45) Date of Patent: May 10, 2016

(54) FORCE TRANSDUCER FORMING A CAPACITIVE LOAD CELL

(75) Inventors: Karlheinz Amtmann, Gerhardshofen (DE); Dominik Braun, Karlsruhe (DE); Jörg Hassel, Erlangen (DE); Harry Hedler, Germering (DE); Hans-Peter Lindner, Fürth (DE); Delphine Meunier, Soufflenheim (FR); Daniel Reznik, Berlin (DE); Klaus Röther, Stutensee (DE); Dirk Scheibner, Nürnberg (DE); Arno Steckenborn, Berlin (DE); Oliver Theile, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 14/118,114

(22) PCT Filed: May 11, 2012

(86) PCT No.: PCT/EP2012/058735
§ 371 (c)(1),
(2), (4) Date: Jan. 27, 2014

(87) PCT Pub. No.: WO2012/156293
PCT Pub. Date: Nov. 22, 2012

(65) Prior Publication Data
US 2014/0123772 A1 May 8, 2014

(30) Foreign Application Priority Data

May 17, 2011 (DE) .......................... 10 2011 076 008

(51) Int. Cl.
*G01L 13/02* (2006.01)
*G01L 1/04* (2006.01)
(Continued)

(52) U.S. Cl.
CPC .. *G01L 1/04* (2013.01); *G01G 3/12* (2013.01); *G01G 7/06* (2013.01); *G01L 1/142* (2013.01)

(58) Field of Classification Search
CPC ...................................................... G01L 13/02
USPC ............................................................ 73/626
See application file for complete search history.

(56) References Cited

U.S. PATENT DOCUMENTS 4,463,614 A     8/1984   Lee
4,561,038 A * 12/1985   Hatton ..................... H01G 5/14
                                                            361/280

(Continued)

FOREIGN PATENT DOCUMENTS

CN         1308797        8/2001
DE       32 18 577        3/1983

(Continued)

*Primary Examiner* — Lisa Caputo
*Assistant Examiner* — Jamel Williams
(74) *Attorney, Agent, or Firm* — Cozen O'Connor

(57) ABSTRACT

A force transducer, in particular a load cell, includes a spring body that deforms when loaded with a force or load to be measured. Two support parts, which are separated by a gap, are moved out of a position of rest. A capacitive displacement detector is used to detect the relative movement of the support parts, where the capacitor includes two electrode combs that are each held on one of the support parts and includes a multiplicity of electrode fingers. The electrode combs are configured designed and mounted on the two support parts such that the electrode fingers of the one electrode comb pass into the finger interspaces of the other electrode comb when the spring body is loaded so that the force transducer is resistant to overloading.

13 Claims, 4 Drawing Sheets

(51) Int. Cl.
    *G01G 3/12* (2006.01)
    *G01G 7/06* (2006.01)
    *G01L 1/14* (2006.01)

(56) References Cited

U.S. PATENT DOCUMENTS

| | | |
|---|---|---|
| 6,594,408 B1 | 7/2003 | Noe |
| 2007/0284964 A1 | 12/2007 | Chung et al. |

FOREIGN PATENT DOCUMENTS

| | | | |
|---|---|---|---|
| DE | EP 0534270 A1 * | 3/1993 | ................ G01L 3/12 |
| DE | EP 2207020 A2 * | 7/2010 | ............ G01L 9/0073 |
| EP | 0 534 270 | 3/1993 | |
| EP | 2 207 020 | 7/2010 | |
| EP | 2207020 A2 * | 7/2010 | ................ G01L 9/00 |
| GB | 2 076 970 | 12/1981 | |
| WO | WO 2007/086489 | 8/2007 | |

\* cited by examiner

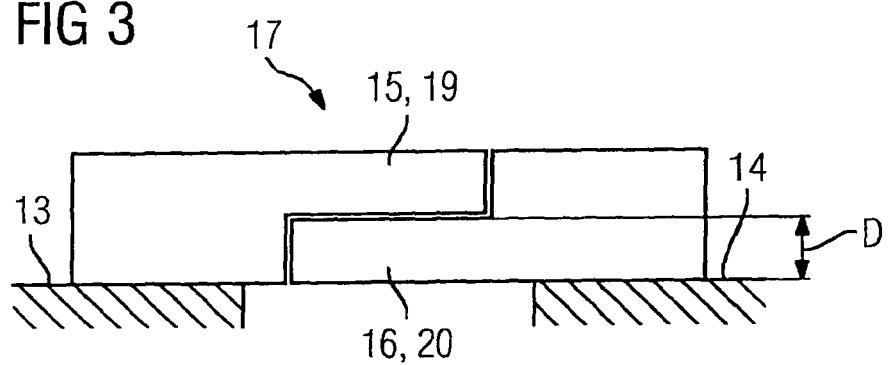
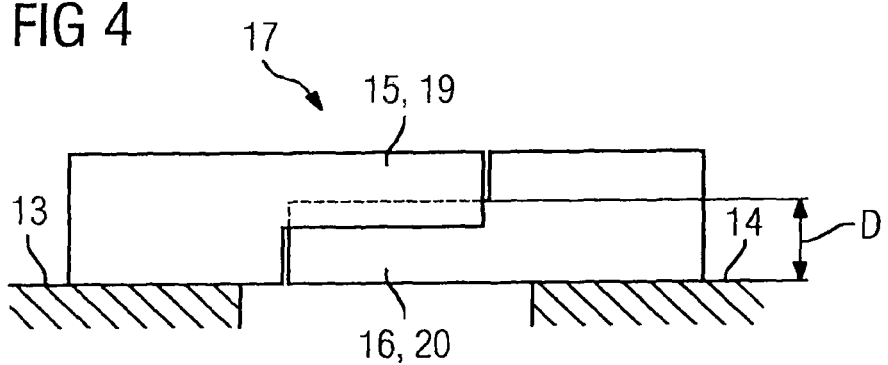
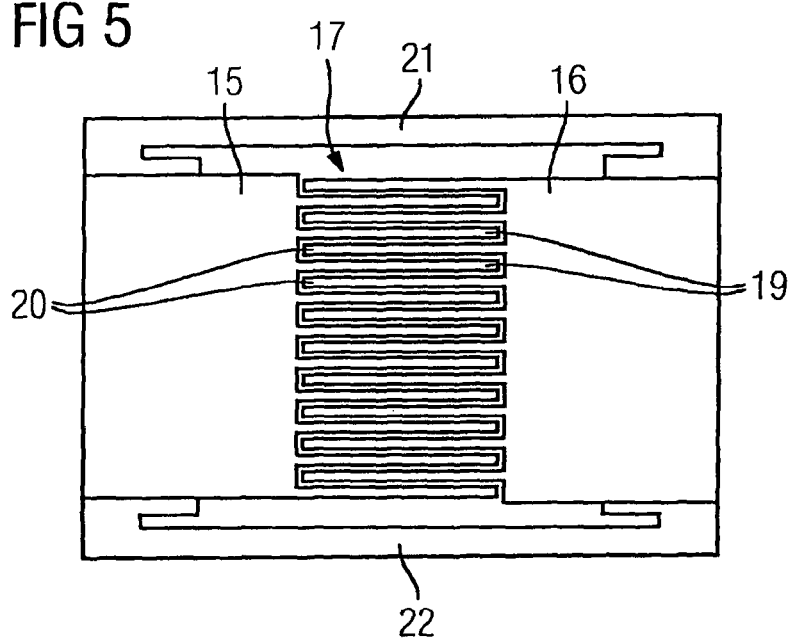

FORCE TRANSDUCER FORMING A CAPACITIVE LOAD CELL

REFERENCE TO RELATED APPLICATIONS

This is a U.S. national stage of application No. PCT/EP2012/058735 filed 11 May 2012. Priority is claimed on Germany Application No. 10 2011 076 008.3 filed 17 May 2011, the content of which is incorporated herein by reference in its entirety.

BACKGROUND OF THE INVENTION

Field of the Invention

The invention relates to a force transducer, in particular a load cell, comprising a spring body, which deforms upon loading with a force or load to be measured and includes two carrier parts separated by a gap, where the carrier parts are moved out of a rest position upon loading the spring body, and comprising a capacitive displacement transducer for detecting the relative movement of the carrier parts, which consists of two electrode combs held respectively on one of the carrier parts and each including a multiplicity of electrode fingers, wherein the electrode combs are held on mutually parallel planar mounting surfaces of the two carrier parts in alignment parallel to one another and to the mounting surfaces, and the electrode fingers of one of the electrode combs move in the finger interspaces of the other electrode comb upon loading the spring body.

Such a Force transducers or load cells are known from FIGS. 8 to 10 of EP 0 534 270 A1, where the electrode combs are held on the carrier parts such that, with the spring body not being loaded, the electrode fingers of one electrode comb are respectively positioned asymmetrically-eccentrically in the finger interspaces of the respective other electrode comb. The electrode fingers produce a parallel connection of a plurality of identical capacitors and are adjusted such that a small and a significantly larger electrode spacing each succeed one another. The small spacings thus determine the capacitance of the displacement transducer. Upon loading the spring body, the distances between the electrode fingers and thus the capacitance of the displacement transducer vary. The electrode structures can be formed by anisotropically etching silicon, where the small electrode spacings can be, e.g., 20 µm.

The movement margin of the electrode combs is limited by the width of the finger interspaces and the finger width, such that the displacement transducer is destroyed upon overloading the force transducer or the load cell.

GB 2 076 970 A discloses a capacitive displacement transducer which consists of two electrode combs and in which the electrode combs are moved with the tips of the electrode fingers—the fingers here are actually coaxial cylinders having different diameters—toward one another, where the electrode fingers of one electrode comb respectively engage into the finger interspaces of the respective other electrode comb to an increasing or decreasing extent depending on the direction of movement. Here, there is also the risk of destruction of the displacement transducer in the case of an overload. In the case of the conventional displacement transducer, a realization of very small electrode structures, e.g., using Micro-Electro-Mechanical Systems (MEMS) technology, would lead to considerable problems in the adjustment of the electrode combs and is therefore virtually impossible.

WO 2007/086489 A1 discloses a pressure sensor using MEMS technology comprising a capacitive displacement transducer which, with regard to its basic construction and its manner of operation, corresponds to the conventional displacement transducer of GB 2 076 970 A. Here, there is once again a high risk of destruction of the displacement transducer upon overloading the pressure sensor.

US 2007/0284964 A1 discloses an electrostatically operating MEMS actuator in which a movement is produced by electrostatic forces between a movably mounted electrode comb and a stationary electrode comb. The electrode combs are formed and arranged such that they have a parallel offset with respect to one another, and that the electrode fingers of the movably mounted electrode comb dip into the finger insterspaces of the stationary electrode comb in a direction perpendicular to the finger length. US 2007/0284964 A1 also discloses, by way of example, how two electrode combs of this type can be produced from a substrate.

DE 32 18 577 A1 discloses a force transducer comprising a spring body, which has two carrier parts separated by a gap, the carrier parts being moved out of a rest position upon loading the spring body. A capacitive displacement transducer serving for detecting the relative movement of the carrier parts has two electrode surfaces, which are arranged on mutually opposite parallel mounting surfaces of the two carrier parts parallel to one another and to the mounting surfaces and move toward one another vertically with respect to their plane upon loading of the spring body. The capacitance is relatively low, and here there is also the risk of destruction of the force transducer upon overloading.

SUMMARY OF THE INVENTION

It is an object of the invention to provide an overload-protected force transducer or such a load cell comprising a capacitive displacement transducer.

This and other objects and advantages are achieved in according with the invention by virtue of the fact that, in the force transducer or load cell of the type mentioned in the introduction, the mounting surfaces holding the electrode combs are formed on the carrier parts such that they are moved vertically with respect to their plane upon the loading of the spring body, and that the electrode fingers of the electrode combs each have a different parallel offset with respect to the mounting surfaces, such that, upon loading the spring body, the electrode fingers of one electrode comb dip into the finger interspaces of the other electrode comb.

On account of the parallel offset of the electrode combs with respect to one another, the capacitance of the displacement transducer with the unloaded spring body is only low and rises with increasing loading of the spring body, because then the electrode fingers respectively of one electrode comb increasingly engage into the finger interspaces of the other electrode comb. An overloading or destruction of the displacement transducer is precluded because the electrode fingers move only in the direction in which the finger interspaces are open toward both sides.

Preferably, the difference in the parallel offset of the electrode fingers of the electrode combs with respect to their mounting surfaces is less than or equal to the height/thickness of the electrode fingers, such that an overlap of the electrode fingers is already present with the spring body being unloaded and the capacitance of the displacement transducer increases largely linearly upon increasing loading.

In order to make it possible to realize very small electrode structures using MEMS technology without the problems associated therewith in the adjustment of the electrode combs, the displacement transducer is preferably produced as one piece and mounted as such on the two carrier parts. In this regard, for the case where an overloading of the force transducer is precluded from the outset or is prevented by additional measures for limiting the deformation of the spring body or in the form of a load stop, the displacement transducer can consist of the electrode combs and at least one flexible, e.g., thin, web connecting them and can be formed integrally in this case. Alternatively, the web can be formed as a fracture web which, after the integral displacement transducer has been mounted on the carrier parts, is removed with complete separation of the two electrode combs. Therefore, the electrode combs preferably each consist of a fragment of a near finished product integral design of the displacement transducer.

In one advantageous embodiment of the force transducer in accordance with the invention or of the load cell in accordance with the invention, the electrode combs are held on a flexible carrier film and are fitted with the flexible carrier film on the carrier parts of the spring body. The abovementioned separation of the electrode combs can then already be effected, if appropriate, before the displacement transducer is mounted on the spring body. The carrier film is preferably formed as a film printed circuit board, which is electrically contact-connected to the electrode combs and serves for connecting the displacement transducer to an evaluation device. Furthermore, the carrier film can particularly and advantageously form part of a flexible enclosure accommodating the electrode combs and protecting them against environmental influences from the surroundings of the location of use of the force transducer or of the load cell. For this purpose, for example, a cover film can be applied on the carrier film that covers the electrode combs and is tightly connected to the carrier film at the edges.

In accordance with a further advantageous embodiment of the force transducer in accordance with the invention or of the load cell in accordance with the invention, a further structurally identical displacement transducer parallel to the displacement transducer is held on the carrier parts, and an evaluation device is provided, which combines the signals of both displacement transducers to form a summation and/or difference signal. The further displacement transducer can be held on the same side of the carrier parts as the one displacement transducer alongside the displacement transducer or on the side of the carrier parts which faces away therefrom. The formation of the summation signal from the signals of the two displacement transducers corresponds to the doubling of the capacitance of an individual displacement transducer and therefore contributes to increasing the measurement sensitivity. At the same time, the difference signal from the signals of the two structurally identical displacement transducers must be zero or at least load-independent in the case of an offset, such that, based on the difference signal, the force transducer or the load cell can be continuously monitored for a possible malfunction. The formation of the difference signal is equivalent to monitoring the signals of the two displacement transducers for correspondence or corresponding behavior and should therefore be equated therewith.

Besides the force or load to be measured, disturbing forces or thermal expansions of the spring body that act on the spring body transversely with respect to the force or load to be measured can also influence the capacitance of the displacement transducer and, if appropriate, further displacement transducer. In order to eliminate these disturbing influences on the result of the force or load measurement, preferably at least one additional capacitive displacement transducer for detecting at least one movement component of the carrier parts that extends runs perpendicularly to the relative movement of the carrier parts that is to be detected by the one displacement transducer or by the one displacement transducer and the further displacement transducer is held on the carrier parts, and an evaluation device is provided, which is designed to correct the signal of the one displacement transducer or the summation and/or difference signal of the one displacement transducer and of the further displacement transducer with the signal of the additional displacement transducer. The additional capacitive displacement transducer can be arranged parallel to the one displacement transducer and likewise can consist of two electrode combs held respectively on one of the carrier parts, the electrode fingers of which electrode combs, however, with the spring body being unloaded, are positioned without a parallel offset with respect to one another but asymmetrically-eccentrically in the finger interspaces respectively of the other electrode comb. The compensation principle underlying this development of the force transducer in accordance with the invention or of the load cell in accordance with the invention is known per se from EP 0 776 467 B1.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to elucidate the invention further, reference is made below to the figures of the drawing, in which:

FIG. 3 shows a side view of a first exemplary embodiment of the capacitive displacement transducer;

FIG. 4 shows a side view of a further exemplary embodiment of the capacitive displacement transducer;

FIG. 5 shows a plan view of the displacement transducer of FIG. 1 or 4;

DETAILED DESCRIPTION OF THE PREFERRED EMBODIMENTS

Figure 1:
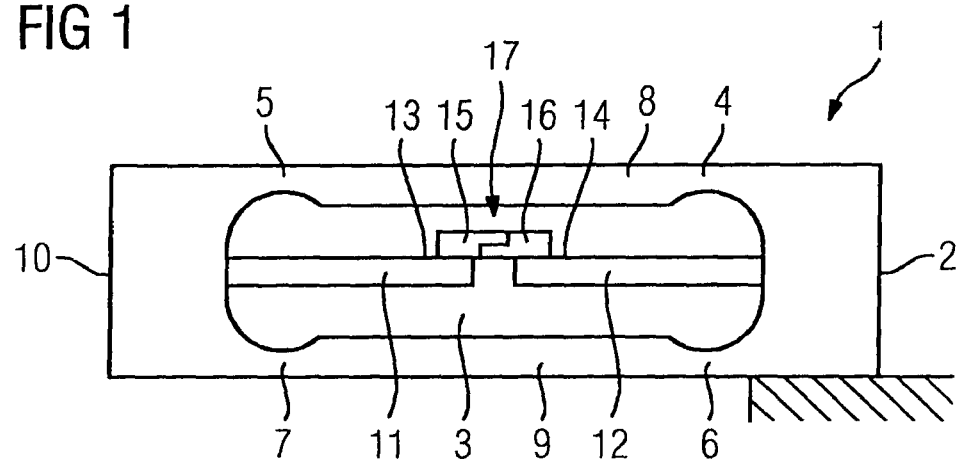
FIG. 1 shows a first exemplary embodiment of a load cell in accordance with the invention with an unloaded spring body and a capacitive displacement transducer.

FIG. 1 shows a greatly simplified illustration of a load cell comprising a spring body 1 in the form of a double bending beam composed of metal, which is fixedly mounted at one end 2 and contains a cutout 3 in the beam center. Regions having a reduced material cross section are provided on the top side and underside of the cutout 3, the regions forming four bending locations 4, 5, 6 and 7 of the double bending beam. The material webs remaining between the bending locations 4 and 5, and respectively 6 and 7, form an upper guide link 8 and a lower guide link 9, which both extend parallel to one another. Within the cutout 3, protruding from the two ends 2 and 10 of the spring body 1, two rigid beam-shaped carrier parts 11 and 12 extend toward one another and end at a distance from one another. Mounting surfaces 13 and 14, which are parallel to one another and aligned with one another with the spring body 1 unloaded, are formed at the free ends of the two beam-shaped carrier parts 11 and 12, on which mounting surfaces one of two electrode combs 15 and 16 of a capacitive displacement transducer 17 is respectively held. Alternatively, provision can be made for the mounting surfaces 13 and 14 to be aligned with the spring body 1 being prestressed, and for the displacement transducer 17 to be mounted on the mounting surfaces 13 and 14 in the pre-stressed state of the displacement transducer 17. The construction of the displacement transducer 17 is explained in greater detail further below.

Figure 2:
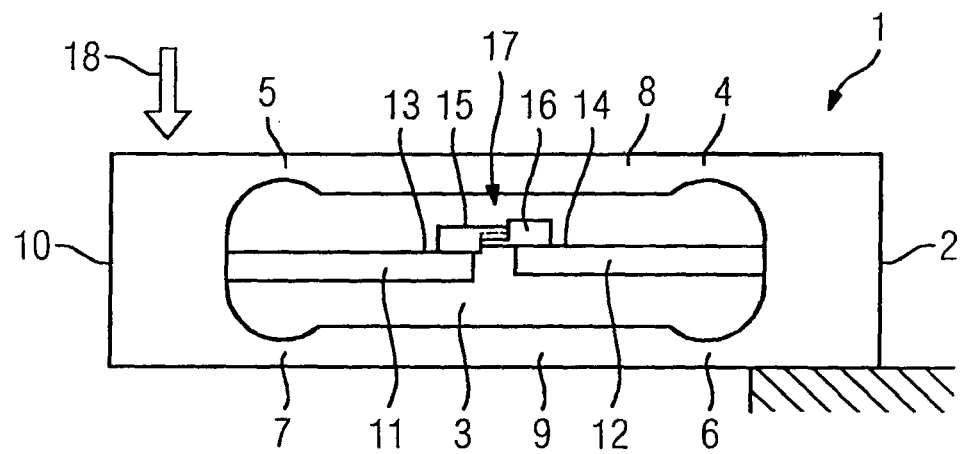
FIG. 2 shows the exemplary embodiment of FIG. 1 with a loaded spring body.

As shown in FIG. 2, when a weight force 18 is applied to the free end 10 of the double bending beam, the spring body 1 flexes downward, where the free end 10 together with the carrier part 11 proceeding therefrom and the electrode comb 15 held on the carrier part are deflected downward. The capacitive displacement transducer 17 detects the relative movement of the carrier parts 11 and 12, the relative movement being proportional to the weight force 18, by way of the changing capacitance between the electrode combs 15 and 16.

FIG. 3 shows the displacement transducer 17 with the two electrode combs 15 and 16 in side view. FIG. 5 shows the same displacement transducer in plan view. The electrode combs 15 and 16 each have a multiplicity of electrode fingers 19 and 20 that extend parallel to the mounting surfaces 13 and 14 with a respectively different parallel offset in relation to the mounting surfaces 13 and 14. The resulting parallel offset between the electrode fingers 19 and 20 of the different electrode combs 15 and 16 corresponds approximately to the thickness or height D of the electrode fingers 19 and 20. Furthermore, the two electrode combs 15 and 16 are arranged staggered in an offset manner, such that the electrode fingers of the electrode comb 15 are situated exactly above the finger interspaces of the electrode comb 16 and the electrode fingers 20 of the electrode comb 16 are situated exactly below the finger interspaces of the electrode comb 15.

As shown in FIG. 5, the two electrode combs 15 and 16 are connected to one another via webs 21 and 22. The webs 21 and 22 are removed only after the application of the displacement transducer 17 with the two electrode combs 15 and 16 on the mounting surfaces 13 and 14 of the carrier parts 11 and 12 or are left given sufficient flexibility of the webs 21 and 22.

Upon loading of the spring body 1 with the weight force 18 (see FIG. 2), the electrode fingers 19 of the electrode comb 15 dip into the finger interspaces of the electrode comb 16, with the result that the capacitance value of the displacement transducer 17 increases.

In order to realize this electrode structure, the displacement transducer 17 is produced using MEMS technology from a silicon or Silicon on Insulator (SOT) substrate by etching on both sides from the top and bottom.

FIG. 4 shows a further exemplary embodiment of the displacement transducer 17 in side view, in which the parallel offset between the electrode fingers 19 and 20 of the different electrode combs 15 and 16 is less than the thickness or height D of the electrode fingers 19 and 20, such that with a non-loaded spring body 1 (see FIG. 1) the electrode fingers 19 of the electrode comb 15 partly dip into the finger interspaces of the electrode comb 16. Upon loading of the spring body 1 with the weight force 18 (see FIG. 2), the electrode fingers 19 of the electrode comb 15 dip further into the finger interspaces of the electrode comb 16, with the result that the capacitance value of the displacement transducer 17 increases. By comparison with the exemplary embodiment of FIG. 3, in this case the increase in capacitance proceeds more linearly depending on the weight force 18. The electrode structure can be produced for example by etching from a Double Silicon on Insulator (DSOI) substrate. The plan view of this exemplary embodiment of the displacement transducer 17 is the same as in the case of the example of FIG. 3 and is illustrated in FIG. 5.

Figure 6:
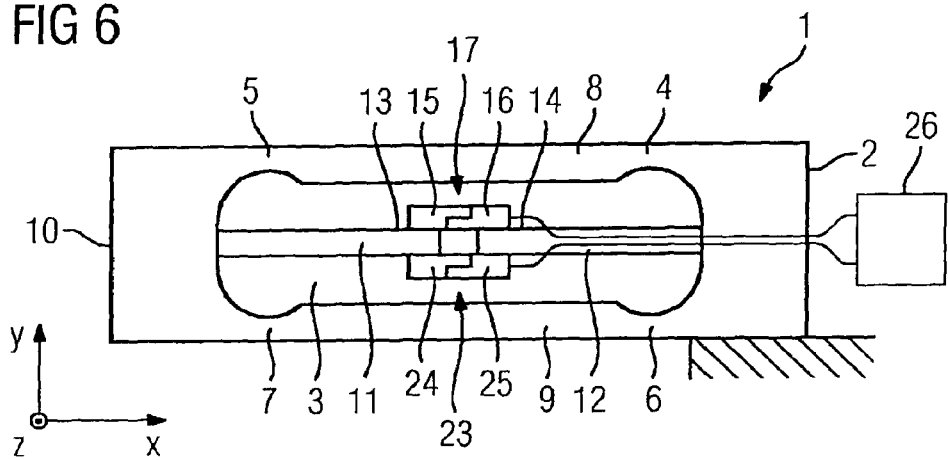
FIG. 6 shows an exemplary embodiment of the load cell in accordance with the invention with a further or additional capacitive displacement transducer.

FIG. 6 shows an embodiment of the load cell illustrated in FIG. 1, where, apart from the displacement transducer 17, a structurally identical further displacement transducer 23 parallel thereto is held on the carrier parts 11 and 12. This further displacement transducer 23 can be fitted with its electrode combs 24 and 25 directly alongside the displacement transducer 17 on the mounting surfaces 13 and 14 or, as in the case of the embodiment illustrated, can be mounted on the underside of the carrier parts 11 and 12 facing away from the displacement transducer 17. The two displacement transducers 17 and 23 therefore generate signals that are identical (or inverse, i.e., oppositely directed, if one of the two displacement transducers is mounted oppositely) and are added and subtracted from one another in an evaluation device 26. The summation signal (or difference signal of the inverse signals) is a measure of the weight force 18 to be measured, while the difference signal (or summation signal of the inverse signals) is equal to or approximately zero in the case of fault-free operation of the load cell and indicates a fault in the displacement transducers 17 and 23 in the event of deviation from zero.

In FIG. 6, the effective direction of the weight force 18 to be measured coincides with the y-direction of a coordinate system. Besides the weight force 18 to be measured, disturbing forces or thermal expansions of the spring body 1 that act on the spring body 1 transversely with respect to said weight force to be measured, i.e., in the x- and z-directions, can also influence the capacitance of the displacement transducer 17 and, if appropriate, further displacement transducer 23. In order to eliminate these disturbing influences on the result of the weight force measurement, additional capacitive displacement transducers for detecting relative movements of the carrier parts 11 and 12 in the x- and z-directions can be arranged on the carrier parts 11 and 12.

Figure 7:
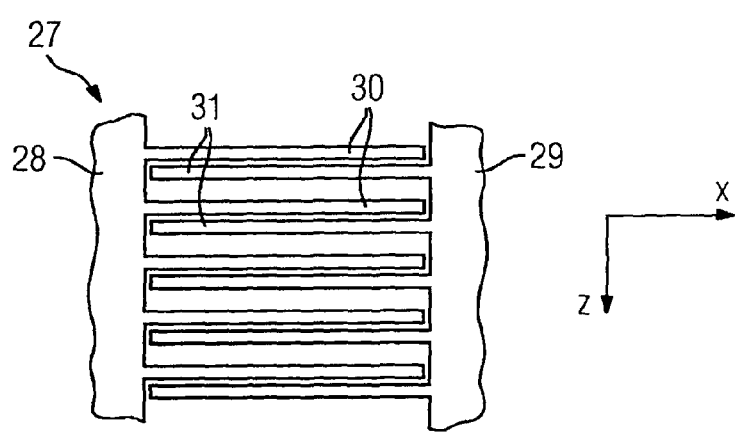
FIG. 7 shows an exemplary embodiment of the additional displacement transducer for detecting transverse forces.

FIG. 7 shows one such additional capacitive displacement transducer 27 for detecting relative movements of the carrier parts 11 and 12 in the z-direction. This additional capacitive displacement transducer 27 likewise consists of two electrode combs 28 and 29 having electrode fingers 30 and 31 arranged in a staggered manner. In contrast to the displacement transducer 17, however, there is no parallel offset in the direction of the finger thickness or height. As a result, the electrode fingers 30 and 31 of each of the electrode combs 28 and 29 permanently engage into the finger interspaces of the respective other electrode comb. This engagement is effected asymmetrically-eccentrically, however, such that a small and a significantly larger electrode spacing each succeed one another. The small spacings thus determine the capacitance of the additional displacement transducer 27 which, in the same way as described above for the further displacement transducer 23, is mounted parallel to the displacement transducer 17 on the carrier parts 11 and 12. Upon transverse loading of the spring body 1 in the z-direction, the distances between the electrode fingers 30 and 31 and thus the capacitance of the additional displacement transducer 27 vary.

Figure 8:
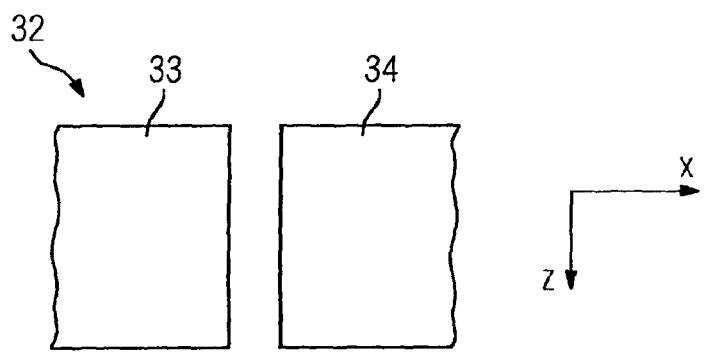
FIG. 8 shows a further exemplary embodiment of the additional displacement transducer for detecting transverse forces or thermal expansions of the spring body.

FIG. 8 shows an example of an additional capacitive displacement transducer 32 for detecting relative movements of the carrier parts 11 and 12 in the x-direction. Relative movements of the carrier parts 11 and 12 in the x-direction in the case of the displacement transducer 17 bring about only small changes in capacitance. As a result, the additional displacement transducer 32 is realized as a simple plate capacitor having capacitor plates 33 and 34 formed using MEMS technology. In particular, the capacitor plates 33 and 34 can be formed directly on the displacement sensor 17 itself, i.e., the displacement transducer 17 and further and/or additional displacement transducers, such as 23, 27 and/or 32, are produced from a substrate and fitted on the spring body 1. In the evaluation unit 26 shown in FIG. 6, the signal of the displacement transducer 17 and, if appropriate, the summation and/or difference signal of the two displacement transducers 17 and 23 are corrected with the signals of the additional displacement transducers 27 and 32. All the displacement transducers 17, 23, 27 and 32 react more or less to all movement components in the x-, y- and z-directions. As a result, they can be calibrated for each of these movement components. With three calibrated displacement transducers 17, 27 and 32, three signals $S_i = a_i \cdot x + b_i \cdot y + c_i \cdot z$, i=1, 2, 3, are obtained, which conform to three equations, such that the movement components in the x-, y- and z-directions can be determined from the signals $S_i$.

Figure 9:
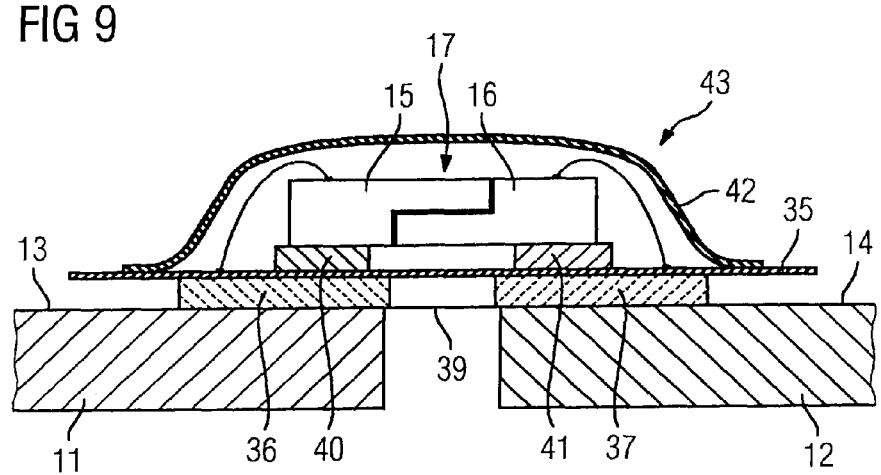
FIG. 9 shows a side view of the displacement transducer fitted on a flexible carrier film and covered with a cover film.
Figure 10:
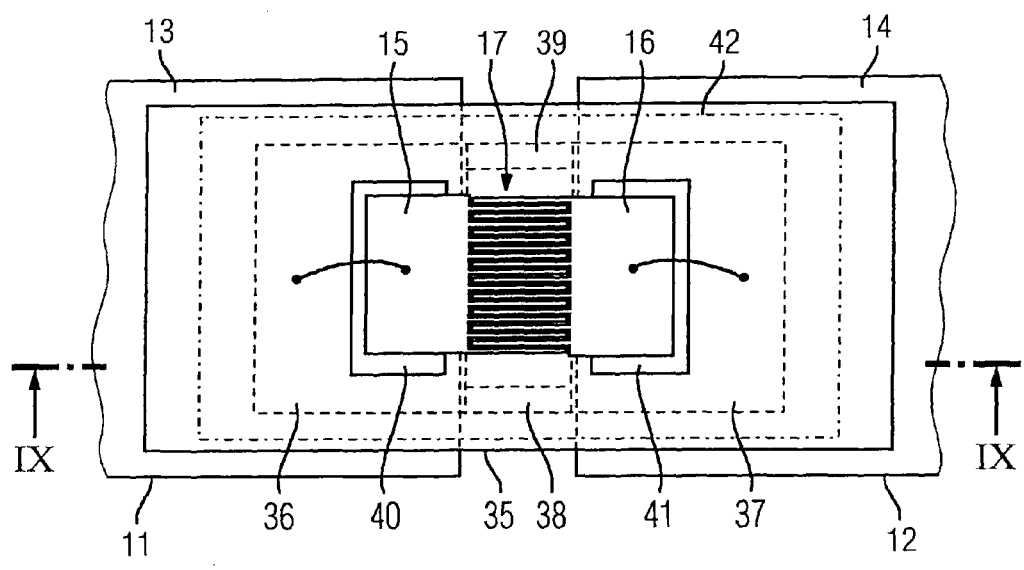
FIG. 10 shows a plan view of the displacement transducer fitted on the carrier film.

FIGS. 9 and 10 show respectively in side view and plan view a further exemplary embodiment, in which the electrode combs 15 and 16 of the displacement transducer 17 are held on a flexible carrier film 35, here e.g.: in the form of a film printed circuit board, and are mounted therewith, if appropriate with the interposition of carrier plates 36 and 37 composed of ceramic, on the carrier parts 11 and 12 of the spring body 1. The ceramic carriers 36 and 37 serve as a fixed support during the production and mounting of the displacement transducer 17 and are connected to one another via fracture webs 38 and 39, which are removed after the displacement transducer 17 has been mounted on the spring body 1. The electrode combs 15 and 16 are mounted directly or via spacers 40 and 41 on the film printed circuit board 35 and are contact-connected thereto. Together with a cover film 42, the film printed circuit board 35 forms a flexible enclosure 43 accommodating the electrode combs 15 and 16 and protecting them against environmental influences.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A force transducer, comprising:
    a spring body including two carrier parts separated by a gap, the spring body deforming upon loading with a force or load to be measured, said two carrier parts being moved out of a rest position upon loading of the spring body; and
    a capacitive displacement transducer for detecting a relative movement of the two carrier parts, the capacitive displacement transducer comprising two electrode combs held respectively on one carrier part of the two carrier parts and each having a plurality of electrode fingers;
    wherein the two electrode combs are held on mutually parallel planar mounting surfaces of the two carrier parts in alignment parallel to one another and parallel to the mounting surfaces, and the electrode fingers of one electrode comb of the plurality of electrode combs move in finger interspaces of another electrode comb upon loading of the spring body;
    wherein the planar mounting surfaces holding the two electrode combs are formed on the two carrier parts such that they are moved vertically with respect to their plane upon loading of the spring body;
    wherein each electrode finger of the plurality of electrode fingers of the electrode combs has a different parallel offset with respect to the mounting surfaces, such that, upon loading the spring body, the electrode fingers of one electrode comb dip into the finger interspaces of the other electrode comb; and
    wherein a difference in a parallel offset of the plurality of electrode fingers of the two electrode combs with respect to their mounting surfaces is less than or equal to a height/thickness of the plurality of electrode fingers.

2. The force transducer as claimed in claim 1, wherein the capacitive displacement transducer is formed integrally in a manner consisting of the two electrode combs and at least one flexible web interconnecting the two electrode combs.

3. The force transducer as claimed in claim 1, wherein the capacitive displacement transducer is formed integrally in a manner comprising the two electrode combs and at least one flexible web interconnecting the two electrode combs.

4. The force transducer as claimed in claim 1, wherein the two electrode combs each comprise a fragment of a near finished product integral design of the capacitive displacement transducer.

5. The force transducer as claimed in claim 1, wherein the two electrode combs are held on a flexible carrier film and are fitted with the flexible carrier film on the two carrier parts of the spring body.

6. The force transducer as claimed in claim 5, wherein the flexible carrier film is formed as a film printed circuit board which is electrically contact-connected to the two electrode combs.

7. The force transducer as claimed in claim 5, wherein the carrier film is formed of two carrier plates supporting the two electrode combs and connected to one another via fracture webs.

8. The force transducer as claimed in claim 6, wherein the carrier film is formed of two carrier plates supporting the two electrode combs and connected to one another via fracture webs.

9. The force transducer as claimed in claim 5, wherein the carrier film forms part of a flexible enclosure accommodating the two electrode combs.

10. The force transducer as claimed in claim 1, further comprising:
    a further structurally identical displacement transducer parallel to the displacement transducer and held on the two carrier parts; and an evaluation device which combines signals of the further structurally identical displacement transducer and the displacement transducer to form at least one of a summation signal and difference signal.

11. The force transducer as claimed in claim 1, further comprising:
at least one additional capacitive displacement transducer held on the two carrier parts and for detecting at least one movement component of the carrier parts which extends perpendicularly to the relative movement of the two carrier parts which is to be detected by one of (i) the displacement transducer and (ii) the one displacement transducer and the further displacement transducer; and
an evaluation device configured to correct one of (i) a signal of the displacement transducer and (ii) at least one of a summation and a difference signal of the displacement transducer and the further displacement transducer with a signal of the additional displacement transducer.

12. The force transducer as claimed in claim 11, wherein the additional capacitive displacement transducer is arranged parallel to the displacement transducer and comprises two electrode combs held respectively on one of the two carrier parts, electrode fingers of which electrode combs with the spring body being unloaded, being positioned without a parallel offset with respect to one another but asymmetrically-eccentrically in the finger interspaces respectively of the other electrode comb.

13. The force transducer as claimed in claim 1, wherein the force transducer is a load cell.

* * * * *